C. A. LINDSTRÖM.
BOX CAR.
APPLICATION FILED APR. 9, 1914.

1,203,369.

Patented Oct. 31, 1916.
6 SHEETS—SHEET 1.

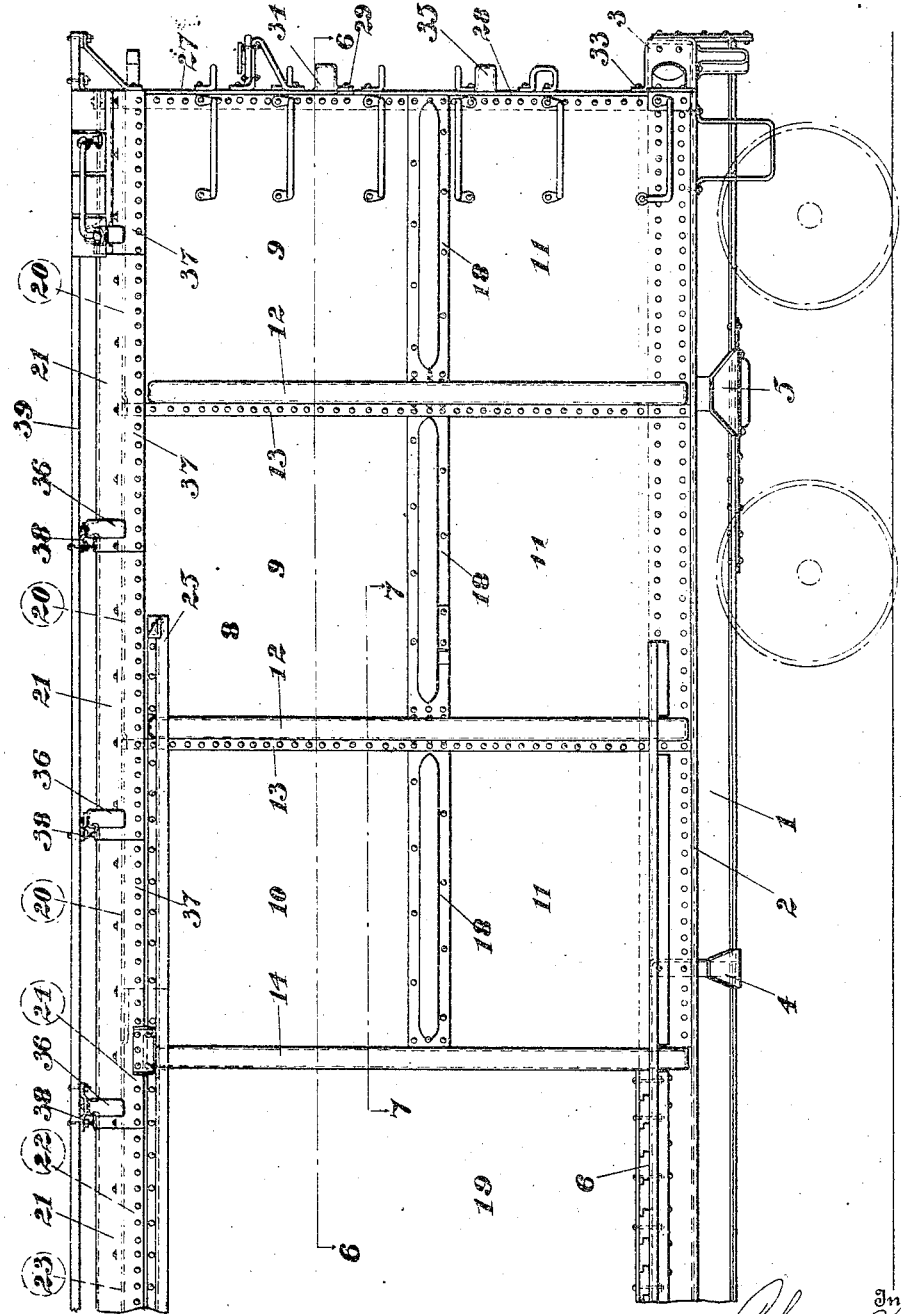

C. A. LINDSTRÖM.
BOX CAR.
APPLICATION FILED APR. 9, 1914.
1,203,369.
Patented Oct. 31, 1916.
6 SHEETS—SHEET 3.
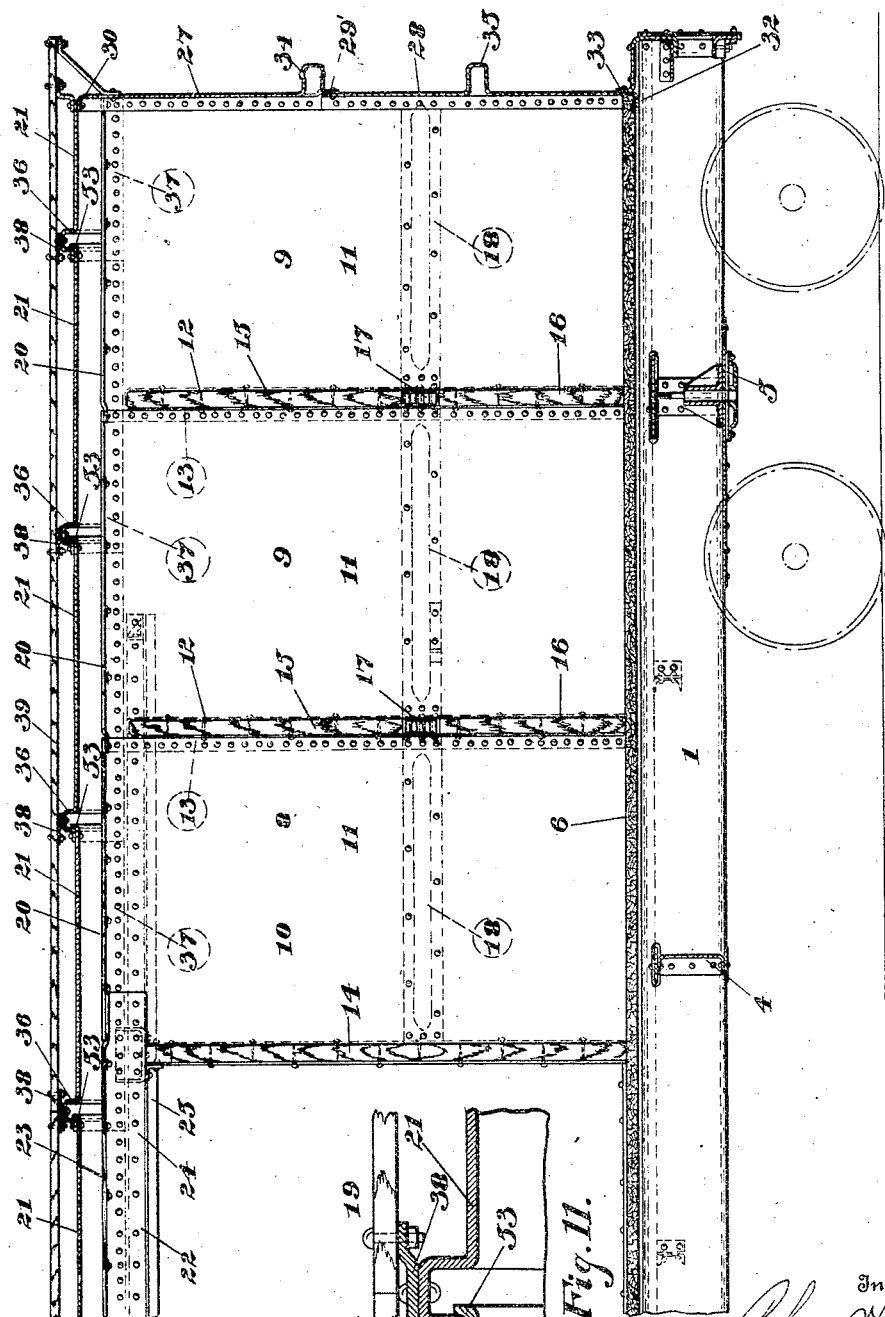
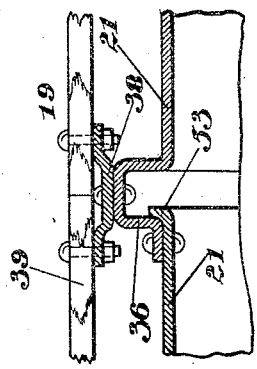

C. A. LINDSTRÖM.
BOX CAR.
APPLICATION FILED APR. 9, 1914.

1,203,369.

Patented Oct. 31, 1916.
6 SHEETS—SHEET 4.

Witnesses
J. McKevitt
Frank E. Miller

Inventor
Charles Lindström

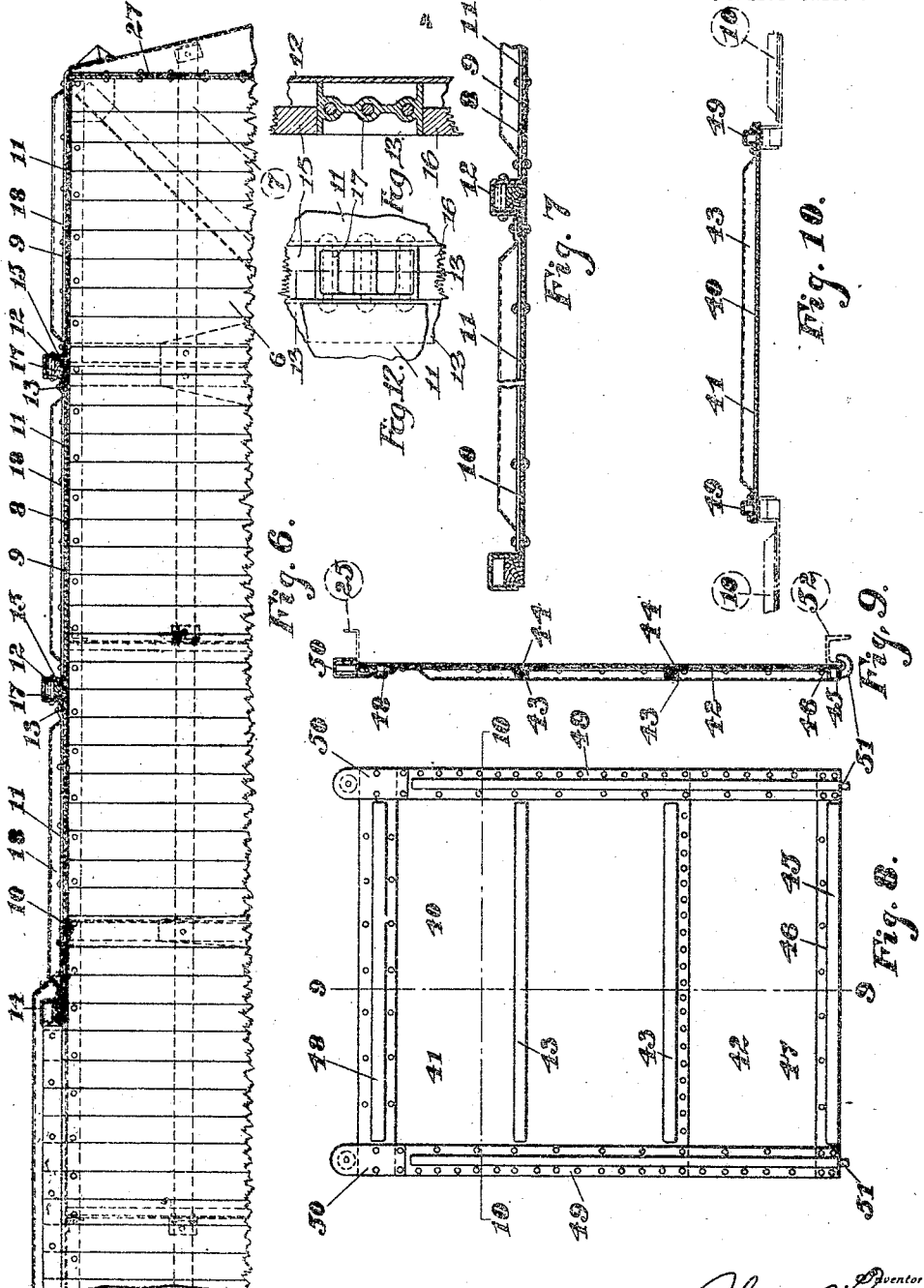

UNITED STATES PATENT OFFICE.

CHARLES A. LINDSTRÖM, OF PITTSBURGH, PENNSYLVANIA, ASSIGNOR TO PRESSED STEEL CAR COMPANY, OF PITTSBURGH, PENNSYLVANIA, A CORPORATION OF NEW JERSEY.

BOX-CAR.

1,203,369.

Specification of Letters Patent.

Patented Oct. 31, 1916.

Application filed April 9, 1914. Serial No. 830,715.

*To all whom it may concern:*

Be it known that I, CHARLES A. LINDSTRÖM, a citizen of the United States, residing at 138 Stratford avenue, Pittsburgh, E. E., in the county of Allegheny and State of Pennsylvania, have invented certain new and useful Improvements in Box-Cars, of which the following is a specification.

An object of the invention is to provide a metallic box car of light, strong and economical construction.

Another object of the invention is to provide a car, the sides, ends and roof of which are made of metal plates formed and connected together in such a manner as to dispense with the usual skeleton upper-framing.

Another object of the invention is to provide a car, the side and end walls of which are provided with corrugations adapted to receive fillers to which the interior lining of the car may be secured, or to which, when it is desired to use the car without interior lining, devices for preventing the lading from shifting may be secured.

Another object of the invention is to provide a self-supporting car roof comprising a plurality of plates corrugated and secured together in such a manner as to dispense with the ordinary carlines.

Another object of the invention is to provide weather tight connections between the side and end walls and the roof of the car and between the plates forming such walls and roof.

A further object of the invention is to provide a member which is adapted to be secured to the side wall, and which, when so secured, will strengthen and stiffen the side wall.

A still further object of the invention is to provide a novel door construction.

Figure 1:
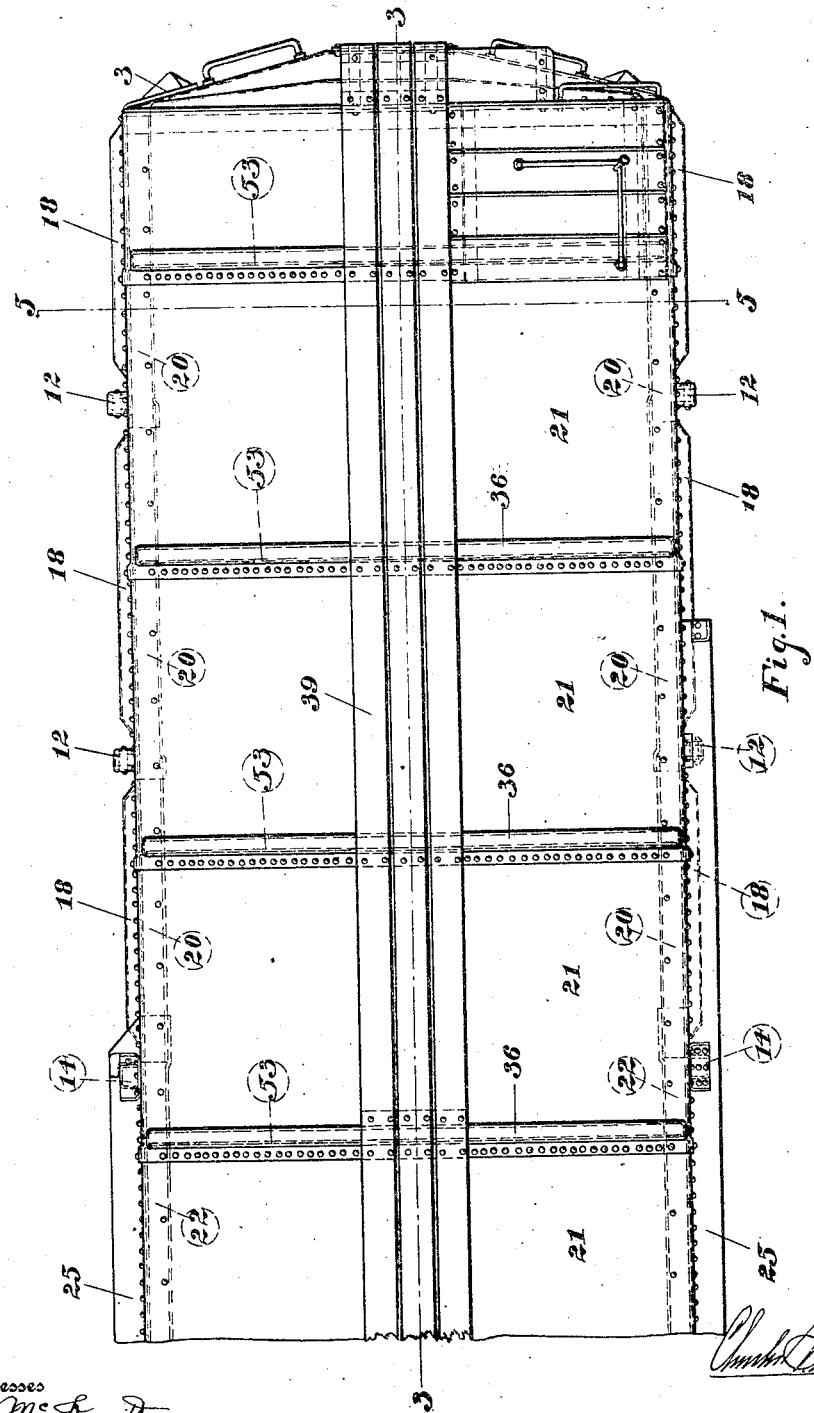
Figure 4:
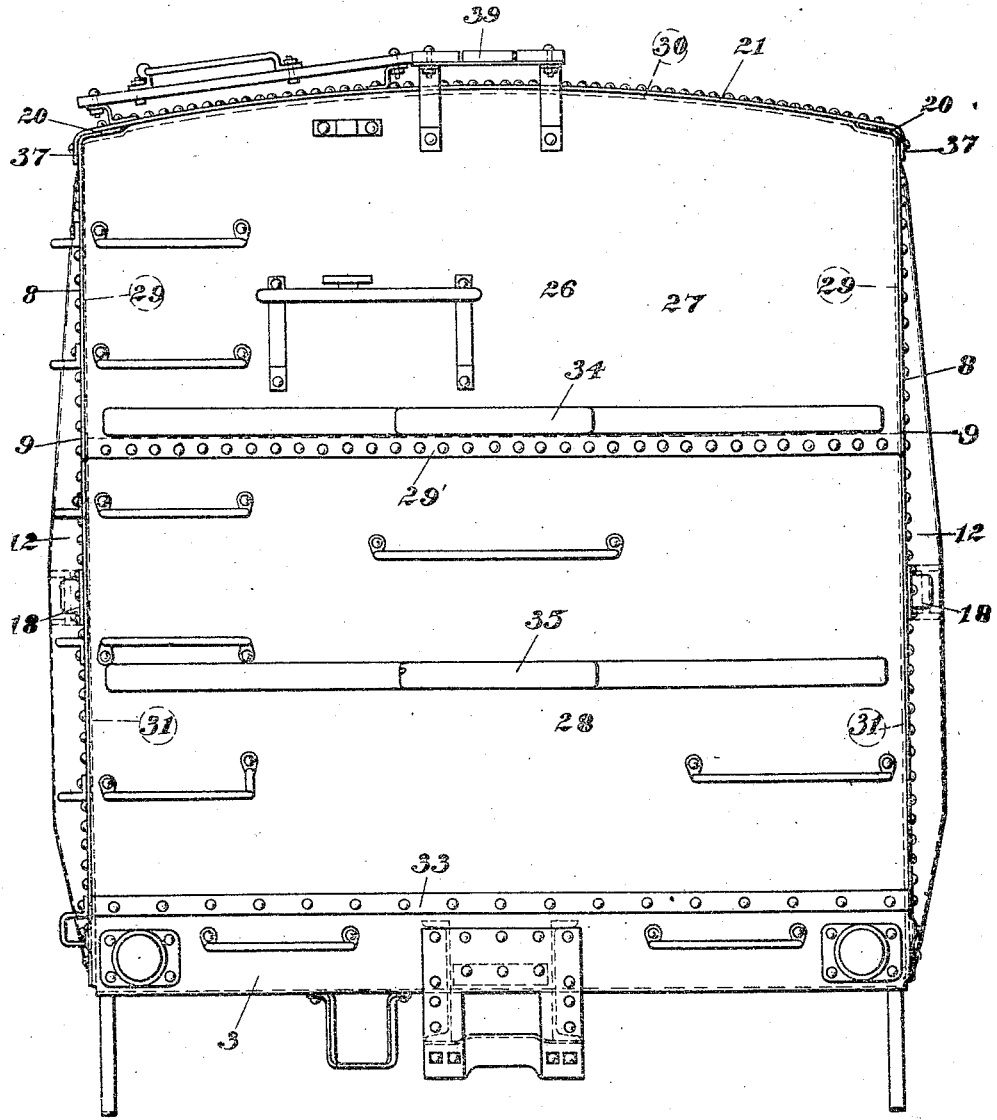
Figure 5:
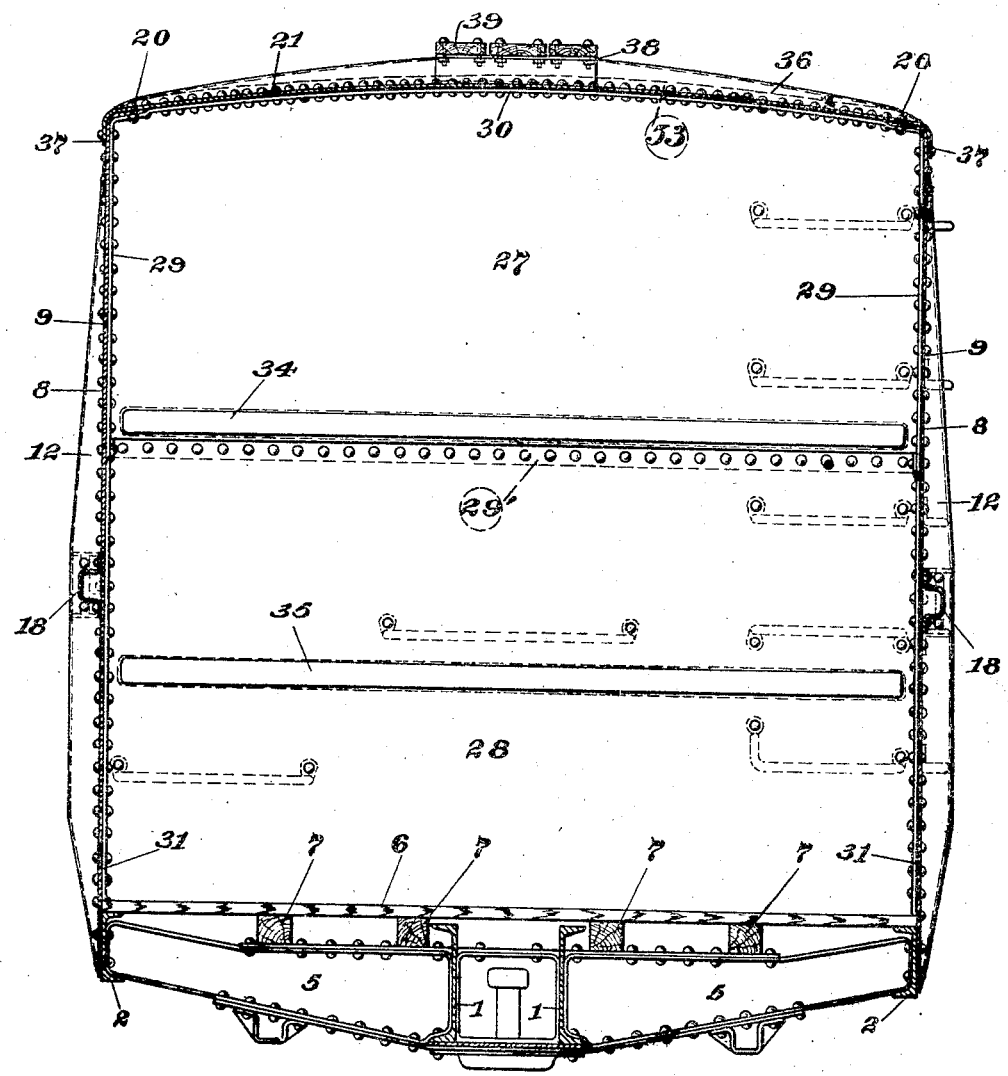

Referring now to the drawings, in which like reference characters refer to like parts, Figure 1 is a plan view of a car constructed in accordance with the invention; Fig. 2 is a side elevational view of the same; Fig. 3 is a longitudinal sectional view taken on the line 3—3 of Fig. 1; Fig. 4 is an enlarged end elevational view of the car; Fig. 5 is an enlarged cross sectional view taken on the line 5—5 of Fig. 1; Fig. 6 is a longitudinal sectional view taken on the line 6—6 of Fig. 2; Fig. 7 is an enlarged detail sectional view taken on the line 7—7 of Fig. 2; Fig. 8 is a detail view of the door; Fig. 9 is a sectional view of the same taken on the line 9—9 of Fig. 8; Fig. 10 is a sectional view taken on the line 10—10 of Fig. 8; Fig. 11 is an enlarged sectional view through two of the roof plates at one of the seams. Fig. 12 is an enlarged detail view of a portion of the side of the car and Fig. 13 is a sectional view of the same taken on the line 13—13 of Fig. 12.

The underframe may be of any suitable construction, and as an illustration, an under frame has been embodied in the several figures of the drawings, which comprises center sills 1, side sills 2, end sills 3, transoms 4 and bolsters 5. The floor 6, which is preferably of wood, may rest on the side sills 2, and intermediate the side sills may be secured to the stringers 7, which rest on the transoms 4 and bolsters 5 and which extend preferably continuously for the full length of the underframe.

The side walls 8 comprise a plurality of metallic plates such as 9 and 10. The plates 9, throughout the car, are substantially alike, each having a portion 11, which is preferably flat, a corrugated portion 12 and a flange 13, which flange 13 is adapted to be secured to the portion 11 of an adjacent plate. The plates 10 are provided with portions 11 adapted to be connected with the flanges 13 of the plates 9 and are also provided with corrugated portions 14 which form door posts. The corrugations 12 and 14 may be of any suitable form, but as shown in the drawings are preferably of U form and extend substantially the full height of the side wall 8. The corrugations formed by the portions 12 have their greatest depth at a point intermediate their ends, and taper or are reduced in depth toward their ends, while the corrugations formed by the portions 14 are preferably of the same depth throughout their length. Each of these corrugations formed by the portions 12 and 14 may be provided with non-metallic fillers 15 and 16 which may be spaced apart by a metallic filler 17. The fillers 15 and 16 may be secured within the corrugations 12 and 14 by any suitable means and when so secured are adapted to add to the strength and stiffness of the side walls 8, and when a car is desired with interior lining these fillers are adapted to receive the securing means for securing such lining thereto. To further strengthen and stiffen the side walls 8, longitudinally extending corrugated members 18 are secured to the plates 9 and 10. The metallic fillers 17 are secured within the corrugations 12 and 14 by rivets or other suitable means, and it will be seen that when these fillers are so secured they, together with the members 18, form in effect a strengthening member which extends from the end of the car to the side door opening 19. By making the fillers of a plurality of parts, strong metallic fillers may be provided where they are needed most, i. e., substantially in line with the members 18, and above and below these fillers, where the corrugations are less liable to be damaged, fillers of less strength may be provided, thus keeping the weight of the car down to a minimum. Further, by this arrangement it will be noted that should any of the parts of the fillers become damaged they may be removed or replaced without removing the parts not damaged. It will be understood that, if desired, the fillers 15, 16 and 17 may be dispensed with, or a single continuous filler may be substituted for these fillers.

The lower portions of the plates 9 and 10 are secured to the side sills by any suitable means. The top portions of these plates are turned inwardly and form a flange 20, to which the roof plates 21 are connected, such flange being either curved or sloped to conform to the shape of the roof plates.

The plates 9, 9 of each side wall are connected together at their top portions by an angular member 22, which bridges the door opening 19. The top flange 23 of this member 22 is of substantially the same form as that of the flanges 16 of the side wall plates 9 and 10, and is adapted to be connected with the roof plates 21. To the flange 24 of the member 22, and to the plates 9 and 10, a door track 25 is secured which may be of any suitable form, but as shown in the drawings is preferably of Z section.

Each of the end walls 26 comprise an upper plate 27 and a lower plate 28 which are connected together at their adjacent edges. The upper plate 27 is provided with marginal side flanges 29 which are connected with the side wall plates 9, and is also provided with a marginal top flange 30, which may be connected to the roof plates 21 by any suitable means. The lower plate 28 is provided with marginal side flanges 31 which are connected to the side wall plates 9, the upper edge being secured to the flange 29' of the upper plate 27. The plate 28 is also provided with a marginal bottom flange 32, which preferably rests on the underframe of the car, and may be secured thereto if desired. Above the flange 32, this plate 28 is connected with the flange 33 of the end sill 3 by any suitable means. The upper plate 27 is provided with a transverse corrugation 34 formed in the plate preferably near the lower edge thereof. The lower plate 28 is provided with a transverse corrugation 35 formed in the plate intermediate its top and bottom edges. Both of these corrugations extend substantially the full width of the end of the car, and preferably have their greatest depth at a point intermediate their ends, and taper or are reduced in depth toward their ends. These corrugations may be provided with fillers to which interior lining may be secured.

The roof of the car comprises a plurality of metal plates 21, which are preferably continuous from side to side of the car, and may be curved or sloped from the center to the sides of the car. Each of the roof plates 21 near one of its edges is provided with a corrugation 36 which extends substantially the full length of the plate, such corrugation tapering from its greatest depth at a point intermediate its ends, and at its other edge is provided with an upstanding portion 53. The outer edge portion of each of the plates 21, in which the corrugation 36 is formed, is adapted to overlap and be secured to the flat edge portion of the adjacent plate. When these plates are secured together in the manner just described, the portion 53 of one of the plates is adapted to extend upwardly within the corrugation 36 of the adjacent plate, the part 53 forming a baffle adapted to prevent any water that might leak through the riveted seams from entering the car. The plates 21 are also provided with downwardly turned portions 37 which are secured to the side walls 8.

It will be seen from the foregoing description that a strong roof is formed without the use of the ordinary carlines. To each of the corrugations 36 a member 38 may be secured to which the running board 39 may be secured.

The side door 40, as shown in detail in Figs. 8, 9 and 10 of the drawings, comprises a plurality of metal plates which have their adjacent edge portions connected together by any suitable means. The top plate 41 is provided with corrugations 43, which extend substantially the full width of the door and are adapted to strengthen and stiffen it. This plate is further strengthened by fillers 44 which may be secured within the corrugations 43. The lower portion of the bottom plate 42 is bent to form an integral box like strengthening portion 45. This portion 45 is flattened at its ends and is provided with a flange 46 which is secured to the portion 47 of the plate 42. To the top portion of the plate 41, a member 48, preferably of flanged U form, is secured, the end portions of such member being flattened. To the side portions of the plates 41 and 42, members 49, preferably of U form are secured, the upper ends of such members being flattened. The door hangers 50 may be secured to the flattened ends of the members 48 and 49, thus securing the adjacent ends of these members together. These side members 49 extend preferably to the lower edge of the door and are provided with hook shaped members 51, which are adapted to engage the angular member 52, secured to the side wall 8, below the floor.

From the foregoing description, it will be seen that changes in the details may be made within the scope and spirit of the invention.

Having thus described the invention, what I claim as new and desire to secure by Letters Patent is:

1. A side wall for railway cars comprising a plurality of corrugated plates secured together, and metallic and non-metallic fillers secured in said corrugations.

2. A side wall for railway cars comprising a plurality of corrugated plates secured together, metallic and non-metallic fillers secured within the corrugations, the non-metallic fillers in each corrugation being spaced apart by said metallic filler.

3. A side wall plate having a corrugation formed therein and a filler comprising a plurality of parts secured within said corrugation.

4. A side wall plate having a corrugation formed therein and a filler secured within said corrugation, said filler comprising a single metallic member and a plurality of non-metallic members.

5. A side wall plate for railway cars having a corrugation formed near one of its edges and a filler comprising a metallic and a non-metallic member secured within said corrugation, said corrugation being tapered.

6. A side wall for railway cars comprising a plurality of plates connected together and having corrugations formed therein, said corrugations being provided with metallic and non-metallic fillers.

7. In a railway car, the combination with an underframe of corrugated plates connected together and secured to said underframe, said plates forming the side and end walls of the car and fillers in the plates forming said side wall, said fillers comprising a plurality of parts, and corrugated roof plates secured to said plates, the corrugations in all of said plates being substitutes for the ordinary upper-framing.

8. A side wall for railway cars comprising a plurality of plates connected together and having corrugations formed therein, said corrugations tapering in depth from a point intermediate their ends, and nailing strips secured in said corrugations.

9. In a car, the combination with an underframe of corrugated side wall plates connected together and secured to said underframe, said plates having inbent upper flanges, a door opening in said plates and an angular member connecting the side wall plates and bridging the door opening, said angular member having an inbent flange overlapping the flanges of adjacent side wall plates.

10. In a railway car, the combination with an underframe, of side wall plates connected together and to said underframe, said plates having inbent upper flanges, a door opening in said side wall plates, and a member adapted to bridge said door opening and overlap the inbent flanges of the plates adjacent such opening.

11. A railway car side wall comprising a plurality of plates connected together, corrugations formed in said plates, stiffening members secured to said plates between said corrugations, and fillers in said corrugations forming in effect continuations of said members.

12. In a railway car, the combination with an underframe, of side wall plates secured to said underframe, said plates being provided with corrugations, stiffening members secured to said plates between said corrugations, and fillers in said corrugations substantially in line with said members.

13. In a railway car, the combination with an underframe, of side wall plates secured together and to said underframe, said plates having inbent upper flanges corrugated roof plates secured to said inbent upper flanges, a door opening in said side wall plates, and a member having an inbent flange secured to said roof and side wall plates adapted to bridge said opening.

14. A side wall plate having a corrugation formed therein, and a member comprising a plurality of parts secured within said corrugation, said member filling the space between the walls thereof.

15. A side wall plate having a vertical corrugation formed therein, and a member comprising metallic and non-metallic parts within said corrugation adapted to fill the space between the side walls thereof.

In testimony whereof I affix my signature in presence of two witnesses.

CHARLES A. LINDSTRÖM.

Witnesses:
 FRANK E. MILLER,
 MARGARET SUMMERBELL.